J. A. SCOTT.
REVERSING AND VALVE OPERATING MEANS FOR INTERNAL COMBUSTION ENGINES.
APPLICATION FILED JAN. 30, 1905.

991,028.

Patented May 2, 1911.

J. A. SCOTT.
REVERSING AND VALVE OPERATING MEANS FOR INTERNAL COMBUSTION ENGINES.
APPLICATION FILED JAN. 30, 1905.

991,028.

Patented May 2, 1911.

Witnesses

Joseph Alvah Scott
Inventor
By his Attorney

J. A. SCOTT.
REVERSING AND VALVE OPERATING MEANS FOR INTERNAL COMBUSTION ENGINES.
APPLICATION FILED JAN. 30, 1905.

991,028.

Patented May 2, 1911.

Witnesses

Joseph Alvah Scott
Inventor
By his Attorney

Fig. 7.

UNITED STATES PATENT OFFICE.

JOSEPH ALVAH SCOTT, OF NEW YORK, N. Y., ASSIGNOR TO SCOTT ENGINE AND CONSTRUCTION COMPANY.

REVERSING AND VALVE-OPERATING MEANS FOR INTERNAL-COMBUSTION ENGINES.

991,028.   Specification of Letters Patent.   Patented May 2, 1911.

Original application filed October 8, 1904, Serial No. 227,680. Divided and this application filed January 30, 1905. Serial No. 243,335.

*To all whom it may concern:*

Be it known that I, JOSEPH ALVAH SCOTT, a citizen of the United States, residing in the city, county, and State of New York, have invented certain new and useful Improvements in Reversing and Valve-Operating Means for Internal - Combustion Engines, of which the following is a specification.

This invention relates to cam-mechanism for operating the valves of internal combustion engines and to means for reversing, the present application being a division of my pending application Ser. No. 227,680, filed October 8, 1904.

The object of the invention is to improve the means for actuating the valves of the engine and for reversing, all as will be particularly hereinafter described.

In the accompanying drawings, which illustrate an embodiment of the invention Figs. 3, 4 and 5 are views illustrating the reversing and the valve-operating cams; Fig. 4, a plan, and Fig. 5 includes a side elevation and a cross-section of the cam for operating the air-inlet valve.

Figure 1:
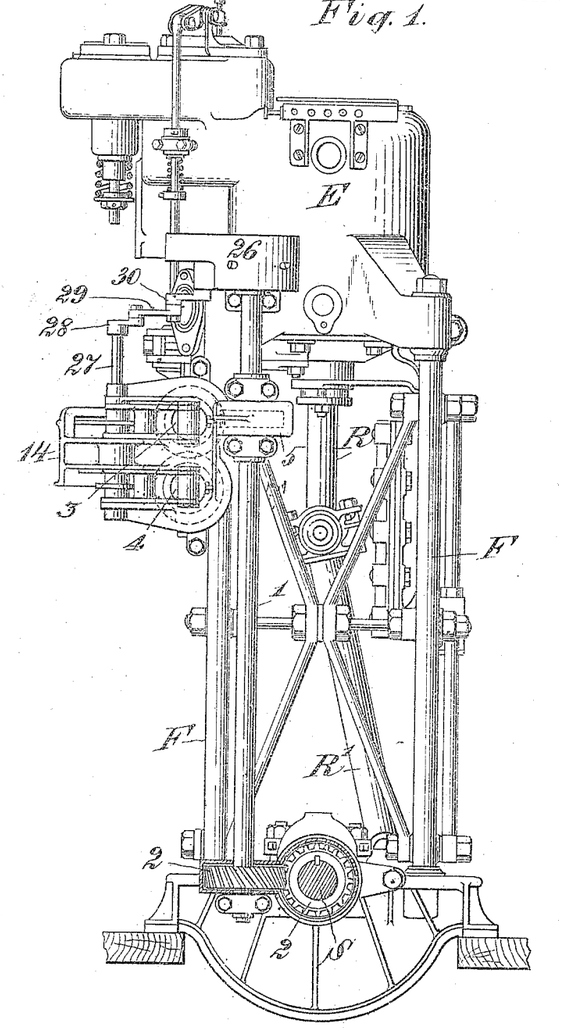
Figure 1 is a side elevation of an engine provided with the improvements.
Figures 2, 6:
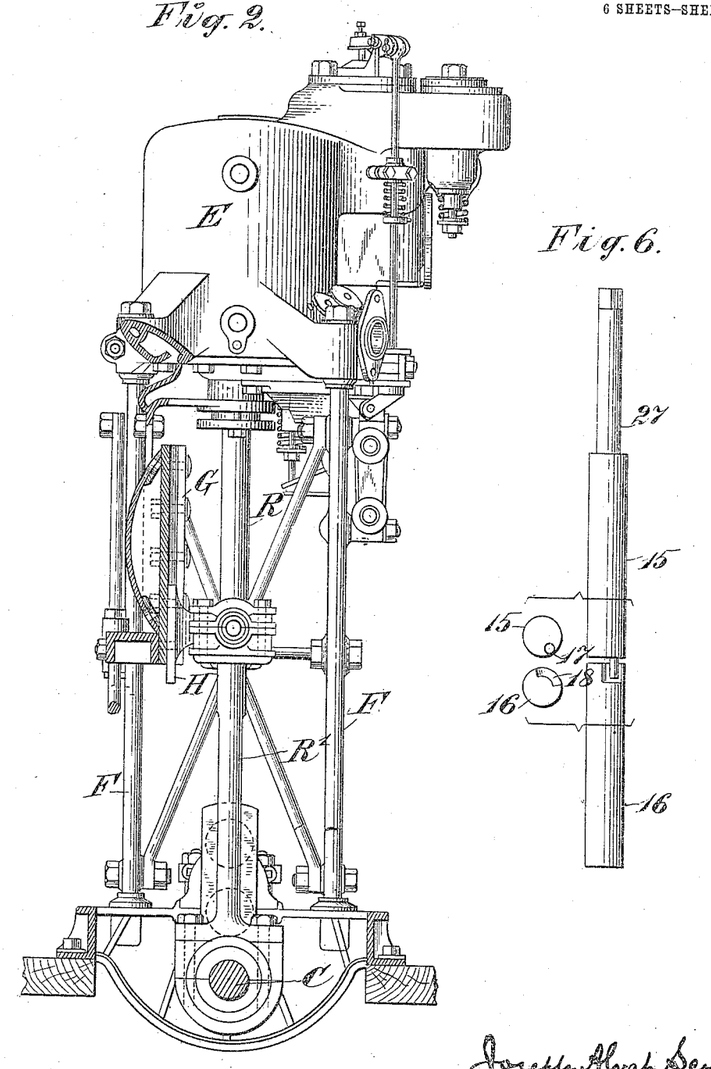
Fig. 2 is a sectional elevation of the engine as seen from the side opposite to that seen in Fig. 1.
Fig. 6 includes a side view and end views of the shafts of the cam-operating levers.

It may be explained primarily, and with reference to Figs. 1 and 2, that F designates a strong frame, which supports the engine E. The piston-rod R of the engine is coupled to a crosshead H, which plays in a guide G, and this crosshead is coupled by a connecting-rod $R^1$, to a crank C, in the main shaft S. The above features, in some form, are common in engines. The particular engine here illustrated, and which forms the subject-matter of my pending application of which this is a division, is adapted for compressing, in the lower end of the cylinder, or that end nearest the crank, air to form the explosive charge, and this air passes thence to and through a carbureter, and thence to the combustion chamber of the engine. The valve which controls the inlet for air to the compressing end of the cylinder; the valve which controls the admission of the combustible charge to the main combustion chamber, and the exhaust valve, are opened positively by cams, and these cams and their operative mechanism will now be described.

1 is an upright shaft, driven from the main shaft S through spiral gears 2, seen in Fig. 1. Mounted rotatively in suitable bearings on the frame, and one above the other, are two cam-shafts, 3 and 4. The upper shaft 3 is driven from the shaft by ordinary spiral gear in housings (5 in Fig. 1). The spiral gear on the shaft 3 is seen at 6 in Fig. 4. The shaft 3 drives the shaft 4 through ordinary spur gears, also housed. Obviously the shafts 3 and 4 may be driven from the main shaft S through the medium of any known form of gearing. The cam shafts will be driven at the same speed as the main shaft in this instance.

Figure 3:
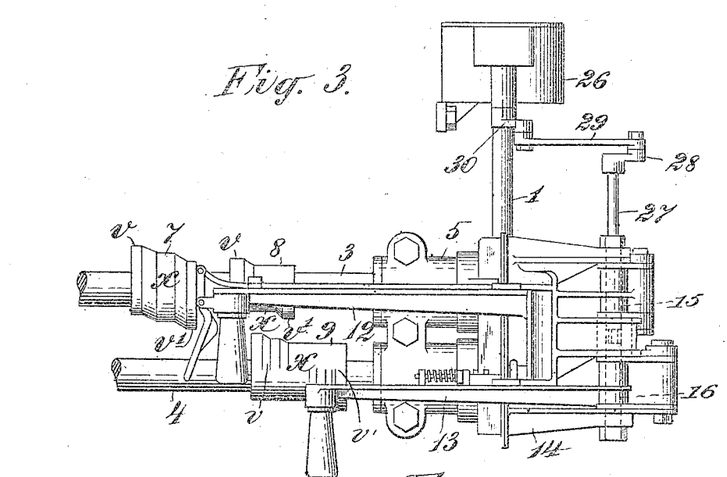
Fig. 3 is a side elevation.
Figure 4:
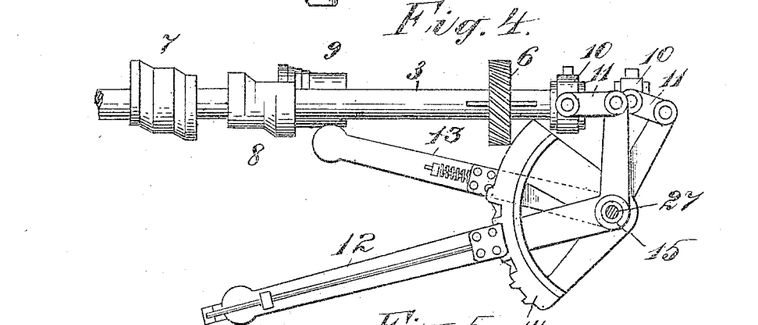
Figure 5:
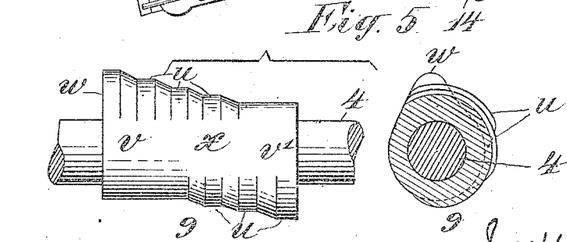

Referring to Figs. 3, 4 and 5, which show the cams best,—on the upper shaft 3 are, the cam 7, which opens the exhaust-valve, and the cam 8, which opens the valve that controls the admission of the explosive charge to the combustion chamber. On the lower shaft 4 is secured the cam 9 which opens the air-inlet valve. It need only be said here of these cams that they act through rods and levers in a known way to operate the respective valves at proper times and hold them open the desired length of time. Each cam, 7, 8 and 9, is made double, as clearly shown in Figs. 3, 4 and 5, for the purpose of reversing, and this is effected by the means best shown in these figures.

The cams, as before stated, are fixed on their respective shafts, and said shafts are mounted slidably so as to play longitudinally in their bearings, the gears on the shafts for driving them being splined so that the shafts may play through them. On the end of each shaft is a loosely collared ring 10, coupled by links 11, to the shorter arm of a reversing elbow-lever 12, for the upper shaft, and a similar lever 13, for the lower shaft.

The cams being double, by shifting them endwise either end-portion may be brought into position to act on the valve through the intermediate mechanism. Or if moved so that the middle portion of the cam is at the working point, the valves will then be operated so as to relieve all pressure in the combustion chamber, thereby causing the engine to stop and leaving it free to move in either direction at will; the air-inlet valve will be left in its minimum power position, enabling the engine to start in either direction with the minimum compression against it. For example, respecting the cams 7 and 8, as seen in Fig. 4; the parts $v$ operate the valves for going ahead, and the parts $v^1$ operate the valves when the engine is reversed. The part $x$, at the middle, is so cut away that when it is brought to the operating point, the cam will operate only to relieve the cylinders of pressure, releasing any remaining charge that may be in them but preventing the admission of any new charge. The cam 9, on the shaft 4, is mounted thus on a separate shaft in order that it may have or perform another function in addition to that of operating the air-inlet valve for running ahead or backward. It is desirable to construct this cam so that it will permit the air-inlet valve to close at different points in the stroke of the piston, in whichever direction the engine may be running. Hence this cam has (in addition to the two operative portions $v$ and $v^1$, and the inoperative or inert middle portion $x$) the operative portion made up of a plurality of sections $u$, so set as to become inactive successively at different points in the revolution of the cam-shaft, thus acting to always open the air-inlet valve at the same point in the stroke, but to hold it open for different periods of time, thereby enabling the engineer to control the amount of air held in the cylinder for compression. The cam may have, and preferably will have (at $w$ in Fig. 5) an enlargement of the section of the cam which is operative when the engine is going ahead at full speed; this enlargement opens the air-inlet valve to a greater extent than the other sections.

The reversing levers play in guides 14, which may be of the usual form and may have the usual locking devices for holding the levers in the positions set. The upper lever 12 will be set in one of three positions, but the lower lever 13, may be so set as to put either one of the sections $u$ of the cam 9 into the proper position to actuate the valve.

The reversing lever 12 is coupled loosely to the lever 13 in such a manner that when the engine is reversed through the lever 12, the cam 9 will also be shifted, but play will be allowed for shifting the cam 9, through its lever 13, independently for the regulation of the speed. This coupling device for operatively connecting the levers 12 and 13 may be of any kind, but the means shown in Fig. 6 will suffice and this will now be described.

The lever 12 is secured to a journal 15, and the lever 13 to a journal 16, the two journals being alined and having bearings in the guide-frame 14. Where the ends of the two journals abut, or come nearly together end-to-end, there is a pin 17 in the journal 15 which engages a recess or way 18 in the upper end of the journal 16. This pin couples the two journals together but permits of some independent movement of the lever 13. By this construction the speed-regulating cam 9 will always be placed with its part $x$ at the operative position when the engine is reversed in either direction, no matter what may be the speed of the engine when the reversing lever 12 is shifted, leaving the after regulation of the cam 9 to be effected by the lever 13. This interlocking of the levers prevents any error in adjusting the speed-controlling cams by permitting the speed-regulating lever 13 to shift the cam 9 in the proper direction only, in whichever direction the engine may be running.

Figure 7:
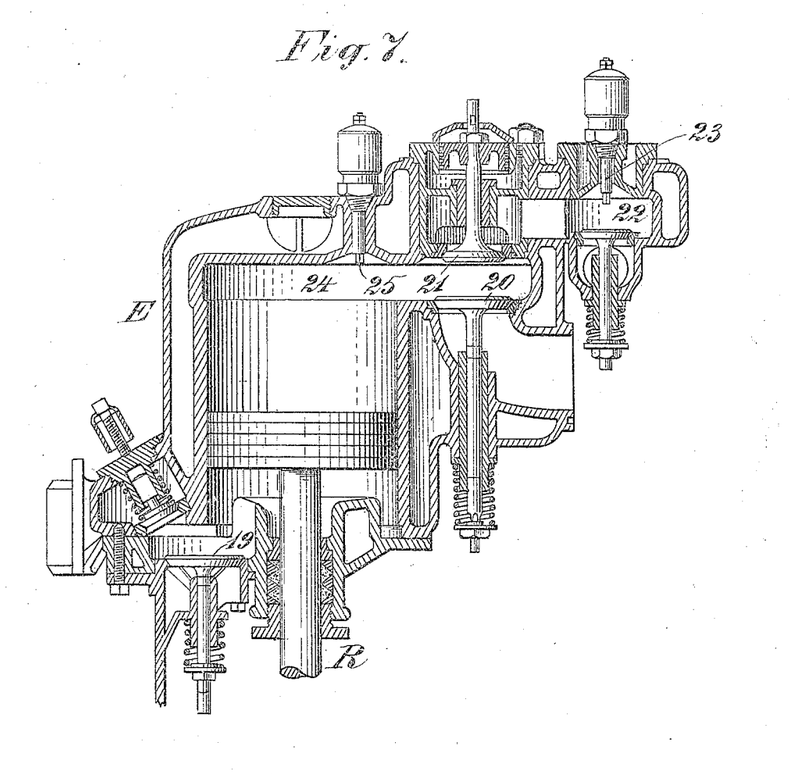
Fig. 7 is a sectional view of the engine showing the igniters and valves.

In Fig. 7, which shows some of the details of the engine, 19 designates the air-inlet valve controlled by the cam 9; 20 designates the exhaust valve, controlled by the cam 7, and 21 designates the valve which admits the charge to the main combustion chamber, and which is controlled by the cam 8. 22 is the supplementary combustion chamber and 23 its igniter; 24 is the main combustion chamber, and 25 its igniter. These features are mainly used illustratively herein.

Figure 8:
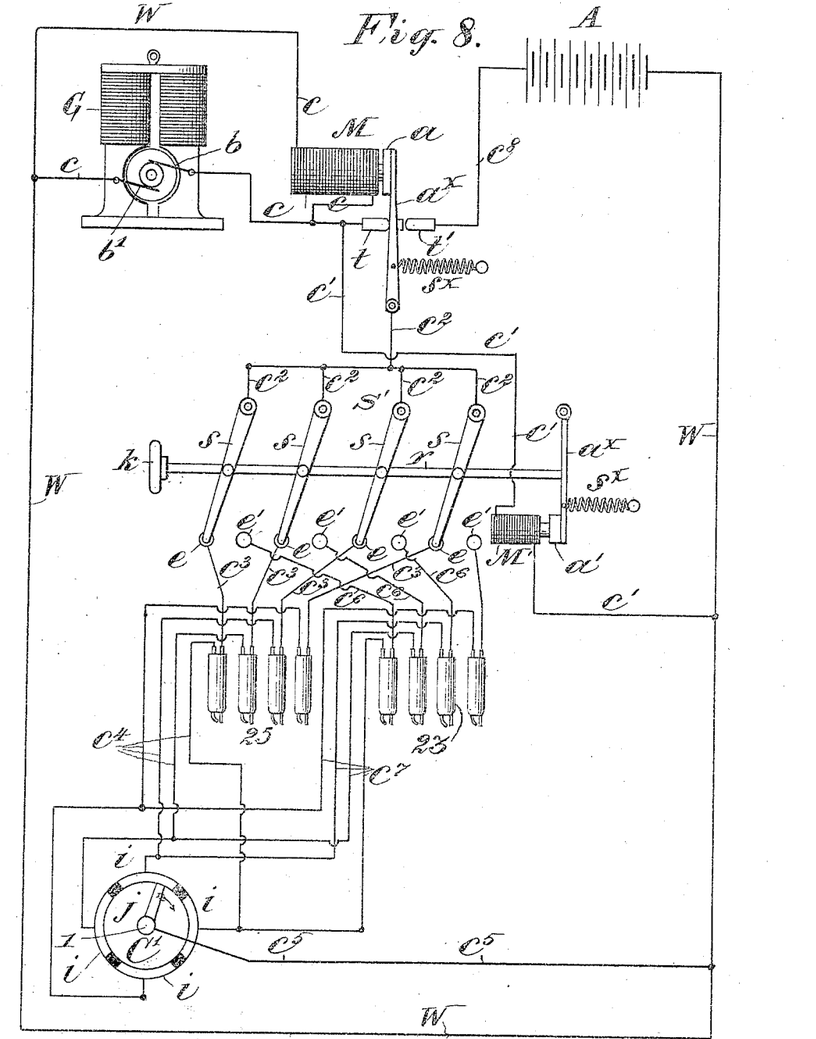
Fig. 8 is a diagrammatic view of the electrical igniting devices, where a metallic circuit is employed.

The electrical igniting or sparking devices, which will be understood from the diagram in Fig. 8, are therein shown as adapted for two pairs of engines coupled to cranks in the same main shaft, but by omission of duplicate parts they may be as well used for one pair, or a single engine. This diagram shows the electrical features, for convenience, arranged as they will be where a full metallic circuit is employed. In Fig. 8, G designates a generator; A, an accumulator or storage battery; M, a magnet for automatically cutting out the accumulator, disposed in the generator circuit; $M^1$, a magnet for automatically cutting out the supplementary igniters 23 after the generator shall have been set in motion by the starting of the engine; 25 are the main igniters; $C^1$ is the rotating controller which completes the circuit successively through the igniters of the four engines; and $S^1$ is the switch device as a whole. The circuits will be traced: When the generator G is running (and this will only be when the engine or engines are running) the current flows from the brush $b$, by wires $c$ and W, to and through magnet M, and thence back to the other brush $b^1$. The magnet M being excited attracts its armature $a$, thus putting the metal armature lever $a^x$ into contact with a terminal $t$. A branch of the current flows by wire $c^1$ to and through magnet $M^1$, thence to the main wire W, and thence back by the wire $c$ to the brush $b^1$ of the generator. The magnet $M^1$ being thus excited, attracts its armature $a^1$, and through a rod $r$, coupled to its armature lever $a^{xx}$, shifts switch-arms $s$ over from contact terminals $e^1$ belonging to the supplementary igniters 23, to the terminals $e$ of the main igniters 25. Another branch of the current flows from the brush $b$ of the generator to the terminal $t$, thence to the armature lever $a^x$, and thence by wires $c^2$, to the several switch-arms $s$; thence by wires $c^3$, to the several main igniters 25, thence, by wires $c^4$, to the respective segments of the controller $C^1$, and thence by wires $c^5$, W and $c$ back to the brush $b^1$.

When the engine or engines stop running, the generator G also stops. The magnets M and $M^1$ cease to be excited and the springs $s^x$ of the respective armature levers retract the latter. Thus the sparking circuit is broken at $t$, and closed to the accumulator A through a terminal $t^1$. At the same time the switch arms $s$ are shifted to the contact terminals $e^1$, which are respectively connected to the segments of the controller $C^1$ by wires $c^6$, to the igniters 23, and by wires $c^7$ from the latter to the controller. The current may flow from one pole of the accumulator by wire $c^8$, lever $a^x$, and wires $c^2$, to the switch-arms $s$, and thence to the igniters 23 and the controller, as explained. From the controller, it flows by wires $c^5$ and W back to the other pole of the accumulator. Consequently, when the engine is to be started up, the supplementary igniters or sparkers will be supplied from the accumulator until the engines are in motion and the generator provides a current; then the accumulator and supplementary igniters will be automatically switched out.

It may be explained here for a better understanding of the requirement for supplementary igniters, that in the engine herein illustrated there is a supplementary combustion chamber 22 through which the explosive charge must flow to the main combustion chamber 24; and this supplementary chamber will always contain a charge of explosive gases sufficient to set the engine in motion. Therefore, in starting the engine the supplementary igniter or sparker will be in circuit and this charge in the supplementary chamber will be ignited. As soon however as the engine is set in motion, the supplementary igniter is switched out and the main igniter switched in.

The switch-shifting magnet $M^1$ is, of course, only a means of operating the switch, and this may be done by hand through a knob $k$ on the rod $r$. The other magnet might also be dispensed with and the accumulator be switched in and out by hand.

The controller $C^1$, which is shown somewhat diagrammatically in Fig. 8, is inclosed in a casing 26, its contact arm $j$, being carried by the upright shaft 1. In reversing, the contacts are shifted by a switch in the casing 26. This switch is actuated by means seen in Fig. 3. The journal 15, of the reversing lever carries as a prolongation a shaft 27 (see also Fig. 6) which has on its upper end a crank-arm 28, coupled by a link 29, to a crank-arm 30. This crank-arm 30 is fixed on a short shaft which extends up into the casing 26 and carries the switch-arm of the controller. Obviously, when the reversing lever 12 is operated, this switch arm will also be operated. As such a controller and switch for reversing is an electrical construction within the knowledge of any electrical engineer, it will only be necessary to say, with especial reference to Fig. 8, that the controller $C^1$ has two sets of contacts $i$, one set being put in the igniting circuit by the wires $c^4$ and $c^7$, when going ahead, and the other when the engine is reversed. This is effected by the switch controlled by the reversing lever. The contact arms $j$ of the controller plays over both sets of contacts. If there is but one engine there will be but two of these contacts in the controller, one for operating when going ahead and the other when the engine is reversed.

Figures 9, 10:
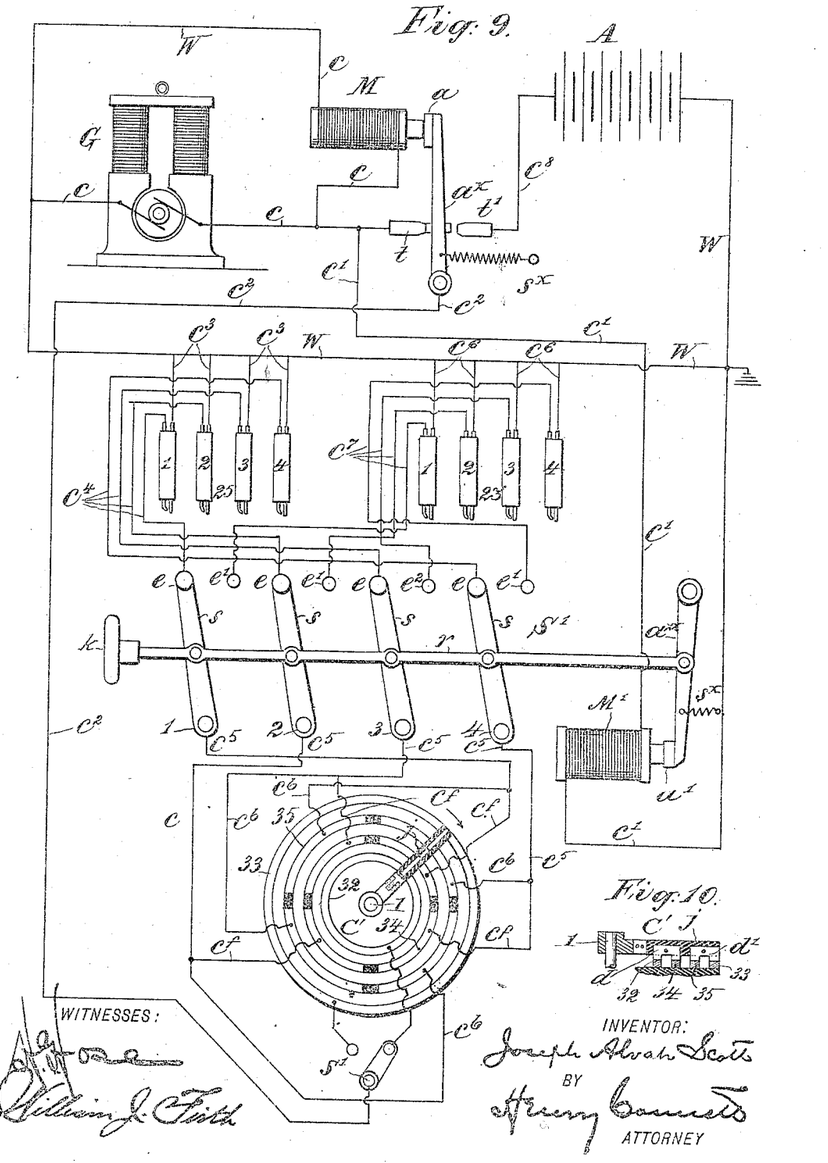
Fig. 9 is a similar diagrammatic view of the same devices as the parts are arranged when a common ground return circuit is employed. This last figure shows the controller enlarged and in detail.
Fig. 10 is a cross-section showing the arm and contacts of the controller.

In the arrangement of the parts as shown in Figs. 9 and 10, where the return of the circuit is grounded, the main construction is the same as that in Fig. 8, but the igniters are between the switch $S^1$ and the generator G. The controller $C^1$ is shown more in detail in these views and this feature will now be described. The controller $C^1$, as shown more in detail in Figs. 9 and 10, has two sets of contacts, one for use when the engines are going ahead, and the other for use when they are reversed or backing, so as to properly time the ignitions. As before stated, this controller and its switch ($s^1$ in Fig. 9) are inclosed in a casing 26, and the switch is operated, for reversing, through the means shown in Fig. 3, namely, the shaft 27, cranks 28 and 30, and connecting link 29. The controller shown in Figs. 9 and 10 (which are drawn to illustrate the principle of construction and operation, where the contact-rings are concentric with the shaft of the arm $j$, and with each other,) there is an inner full ring 32, an outer full ring 33, and two intermediate segment rings 34 and 35. The arm $j$ is made from insulating material (Fig. 10) and carries two U-shaped, metallic bridge-contacts $d$ and $d^1$, the former connecting (electrically) the inner ring 32 with the inner segment ring, and the latter connecting (electrically) the outer ring 33 with the outer segment ring. The four switch arms $s$ are, for convenience of description, numbered 1, 2, 3 and 4, and the igniters also. Each switch-lever is connected electrically by branched wires $c^5$ with segments of the two segment circles 34 and 35 of the controller, these branches being designated $c^f$ for "forward" and $c^b$ for "backward." It will be noted from the arrow in Fig. 9 which way the arm $j$ moves when the engine is running "forward" or normal, and of course the arm will move in the opposite direction when the engine is running "backward" after reversal. It will also be noted that the branches $c^f$ and $c^b$ of each wire $c^5$ connect, respectively, with segments of the rings 34 and 35, and also that the branch $c^f$ connects with the next segment of ring 34 ahead of that segment of the ring 35 with which the branch wire $c^b$ connects. This will make clear the operation of the controller.

Having thus described my invention, I claim—

1. An internal combustion engine, having controlling valves, namely: for the admission of the explosive charge, for the exhaust, and for the admission and regulation of the air supply for primary compression, changeable cams which control said valves, a rotating shaft on which are mounted the cams controlling the admission of the explosive charge and for controlling the exhaust, a rotating shaft on which is mounted the air-admission cam, means for shifting together the three above named cams for reversing, and independent means for shifting the cam which controls the air-admission valve, for the purpose specified.

2. An internal combustion engine, having controlling valves for the admission of the compressed explosive charge, the outlet of the exhaust, and the admission and regulation of the air supply for primary compression, changeable cams which control said valves, shiftable cam-shafts on which said cams are mounted, means for driving said shafts simultaneously, means for shifting said shafts in order to change the cams for reversing, and independent means for shifting the cam which controls said air-admission valve.

3. An internal combustion engine having valves controlling the combustible charge, the exhaust, and the admission and regulation of air admitted for compression, changeable cam mechanism for controlling said valves for reversing and controlling the power of the engine, and common means for moving certain of said cams to the limits of their movement and substantially simultaneously moving others to inoperative mid-position only when the engine is reversed.

4. An internal combustion engine, having valves controlling the admission of the compressed explosive charge, the exhaust, and the admission of the air for compression to the cylinder, automatic means for closing said valves, changeable cams which control the opening of said valves, slidable camshafts on which said cams are mounted, suitable means for driving said cam-shafts at the same speed as the main shaft of the engine, an electric controller which controls the electric sparkers, manually operatable means for simultaneously changing all of the valve-operating cams and the electric controller, for reversing, for cutting out the electric sparking means, and for rendering the cams inoperative, and separate manually operative means for controlling the power of the engine by shifting the cam which controls the air-admission valve.

5. An internal combustion engine having valves adapted to control the admission of a compressed explosive charge, an exhaust, a port for the admission of air to a compression cylinder, means for closing the said valves, cams for controlling the valves, a shaft on which the said cams are mounted, a main shaft, connections between the main shaft and the cam shaft by which the two shafts are driven at the same speed, an electrical sparker, means for controlling the sparker, means for simultaneously changing the position of the cams and the electric controller, and independent means for moving one of the cams to control the admission valve.

6. An internal combustion engine having a port for the admission of a compressed explosive charge, an exhaust, and a port for the admission of air for the primary charge, valves controlling the said ports and exhaust, cams to control said valves, a shaft on which the cams are mounted, means for rotating said shaft, means for simultaneously reciprocating the shafts to change the position of the cams, and independent means for reciprocating the cam which controls the air admission valve.

7. In an internal combustion engine, valve operating mechanism adapted to secure the operation of the engine in either direction; means for shifting said valve operating mechanism to determine the direction in which the engine shall run; igniting mechanism; controlling means for determining the time at which said igniting mechanism shall act when the engine is to run in one direction; other controlling means for determining the time at which said igniting mechanism shall act when the engine is to run in the other direction; and a connection between said valve operating mechanism and said controlling means whereby said controlling means is operated from said valve operating mechanism.

8. In an internal combustion engine, valve operating mechanism adapted to secure the operation of the engine in either direction; means for shifting said valve operating mechanism to determine the direction in which the engine shall run; electrical igniting mechanism including a circuit closer for determining the time at which said igniting mechanism shall act when the engine is to run in one direction and a second circuit closer for determining the time at which said igniting mechanism shall act when the engine is to run in the other direction; and means dependent for its operation upon movement imparted to said valve operating mechanism when it is shifted as above for placing one or the other of said circuit closers in operation.

9. In an internal combustion engine, valve operating mechanism adapted to secure the operation of the engine in either direction; means for shifting said valve operating mechanism to determine the direction in which the engine shall run; electrical igniting mechanism including a circuit closer for determining the time at which said igniting mechanism shall act when the engine is to run in one direction and a second circuit closer for determining the time at which said igniting mechanism shall act when the engine is to run in the other direction; a switch for directing the flow of current through one or the other of said circuit closers; and a connection between said valve operating mechanism and said switch whereby said switch will be operated as said valve operating mechanism is shifted.

10. In an internal combustion engine, valve operating mechanism adapted to secure the operation of the engine in either direction; means for shifting said valve operating mechanism to determine the direction in which the engine shall run; electrical igniting mechanism including a circuit closer having two sets of contacts, one set for use when the engine is to run in one direction and the other set for use when the engine is to run in the other direction; a switch for directing the flow of current through one or the other of said sets of contacts; and a connection between said valve operating mechanism and said switch whereby said switch will be operated as said valve operating mechanism is shifted.

11. In an internal combustion engine, valve operating mechanism adapted to secure the operation of the engine in either direction; electrical igniting mechanism including a spark plug and two separate circuit closing devices, one for use when the engine is running forward and the other when it is running backward; and means operated by said valve operating mechanism as it is shifted for placing one of said circuit closers in effective operation and interrupting the effective operation of the other.

12. In an internal combustion engine, a supply valve; an exhaust valve; a pump; an inlet valve for said pump; a cam for operating each of said valves; means for simultaneously shifting said cams to secure a reversal of the direction of rotation of the engine; and means for moving the cam which controls the supply valve of the pump independently of said other cams.

13. In an internal combustion engine, the combination with a plurality of reversible valve operating mechanisms, of means for shifting one of said mechanisms from one of its operative positions to the reverse operative position and simultaneously moving another mechanism from an operative to an inoperative position.

14. In an internal combustion engine, the combination with a plurality of reversible valve operating mechanisms, of means for shifting one of said mechanisms from one of its operative positions to the reverse operative position and simultaneously moving another mechanism from an operative to an inoperative position, and means for shifting the latter mechanism from said inoperative position to the reverse operative position independently of the first mentioned mechanism.

15. In an internal combustion engine, the combination with a plurality of reversible valve operating mechanisms, of one means for shifting one of said mechanisms from one of its operative positions to the reverse operative position and simultaneously moving another mechanism from an operative to an inoperative position, and an independent means for shifting the latter mechanism from such inoperative position to the reverse operative position.

16. The combination with a reversible explosion engine, of mechanism for controlling its direction of movement, ignition mechanism, one means for controlling the operation of the ignition mechanism when the engine is run in one direction, another means for controlling the operation of the ignition mechanism when the engine is run in an opposite direction, and common means for operating the controlling mechanism of the engine and controlling means of the ignition mechanism to reverse said engine.

17. The combination with a reversible explosion engine, of reversible valve operating mechanism for controlling its direction of movement, ignition mechanism, one means for controlling the operation of the ignition mechanism when the engine is run in one direction, another controlling means for the ignition mechanism when the engine is run in an opposite direction, and common means for reversing the valve operating mechanisms and respectively throwing into and out of operation the different ignition controlling means to reverse the engine.

In witness whereof I have hereunto signed my name this 11th day of January 1905, in the presence of two subscribing witnesses.

JOSEPH ALVAH SCOTT.

Witnesses:
W. J. LIPPMANN,
BENJAMIN H. HOLT.